United States Patent

Pappas

[15] 3,637,999
[45] Jan. 25, 1972

[54] VARIABLE RATE COMPUTING AND RECORDING REGISTER

[72] Inventor: Michael Pappas, Irvington, N.J.
[73] Assignee: Lockheed Aircraft Corporation, Burbank, Calif.
[22] Filed: May 25, 1970
[21] Appl. No.: 40,003

[52] U.S. Cl..........................235/94 A, 235/58 P, 235/144 D, 222/30, 346/43
[51] Int. Cl.......................................................B67d 5/22
[58] Field of Search ..................235/94 R, 94.1, 50 P, 144 D; 222/23, 30, 32, 36, 37; 346/43

[56] References Cited

UNITED STATES PATENTS

| 3,121,531 | 2/1964 | Bumpus, Jr. et al. | 235/58 P |
| 3,139,027 | 6/1964 | Norman | 235/94 R X |
| 3,337,127 | 8/1967 | Sundblom | 235/58 P X |
| 3,358,921 | 12/1967 | Berck et al. | 235/94 A |

Primary Examiner—Richard B. Wilkinson
Assistant Examiner—Stanley A. Wal
Attorney—Billy G. Corber and George C. Sullivan

[57] ABSTRACT

A computing and recording register wherein integrating digital counters are driven by an input shaft to perform quantity, price and tax computations. The price and tax counters are driven by computer gearing coupled to the quantity counter drive gearing through a clutch. A two-stage advance mechanism rounds off the least significant digit of each of the counters and aligns the digits for printing quantity, price and tax data on a recording sheet at the conclusion of each transaction to be recorded. During the first stage, the quantity counter is advanced to align the digits while the clutch is engaged so that the price and tax counters are driven as the quantity counter advances. During the second stage, the clutch is disengaged and the price and tax counters advance independently of the quantity counter.

Also included are a plurality of variable ratio gear trains adjustable through a translatable and rotatable selector shaft for changing one or more of the gear ratios to select the desired tax rate and price per quantity unit.

23 Claims, 17 Drawing Figures

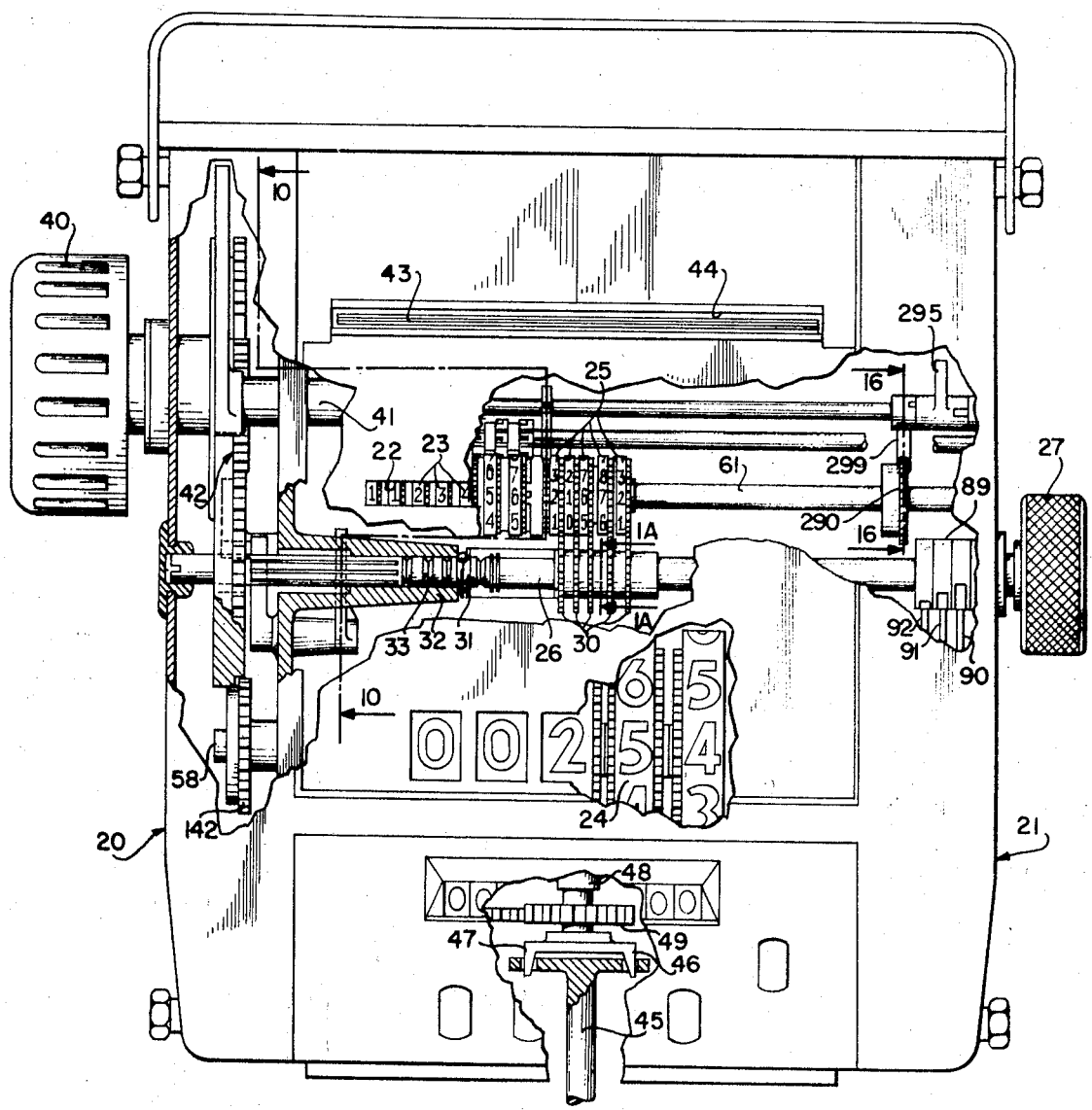
FIG_1
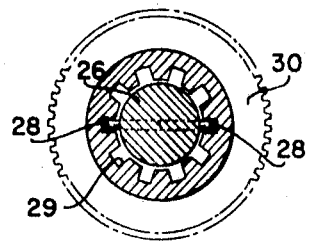
FIG_1A

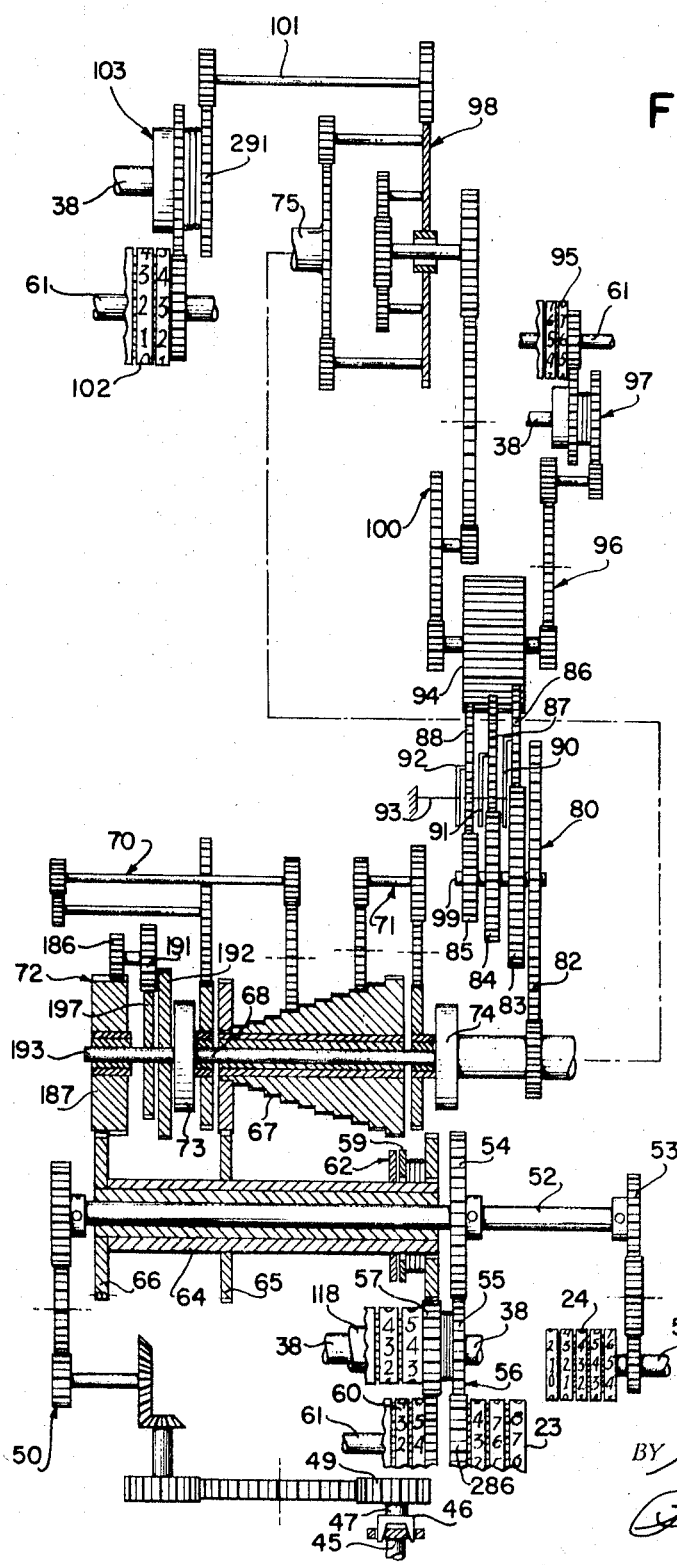
FIG_2

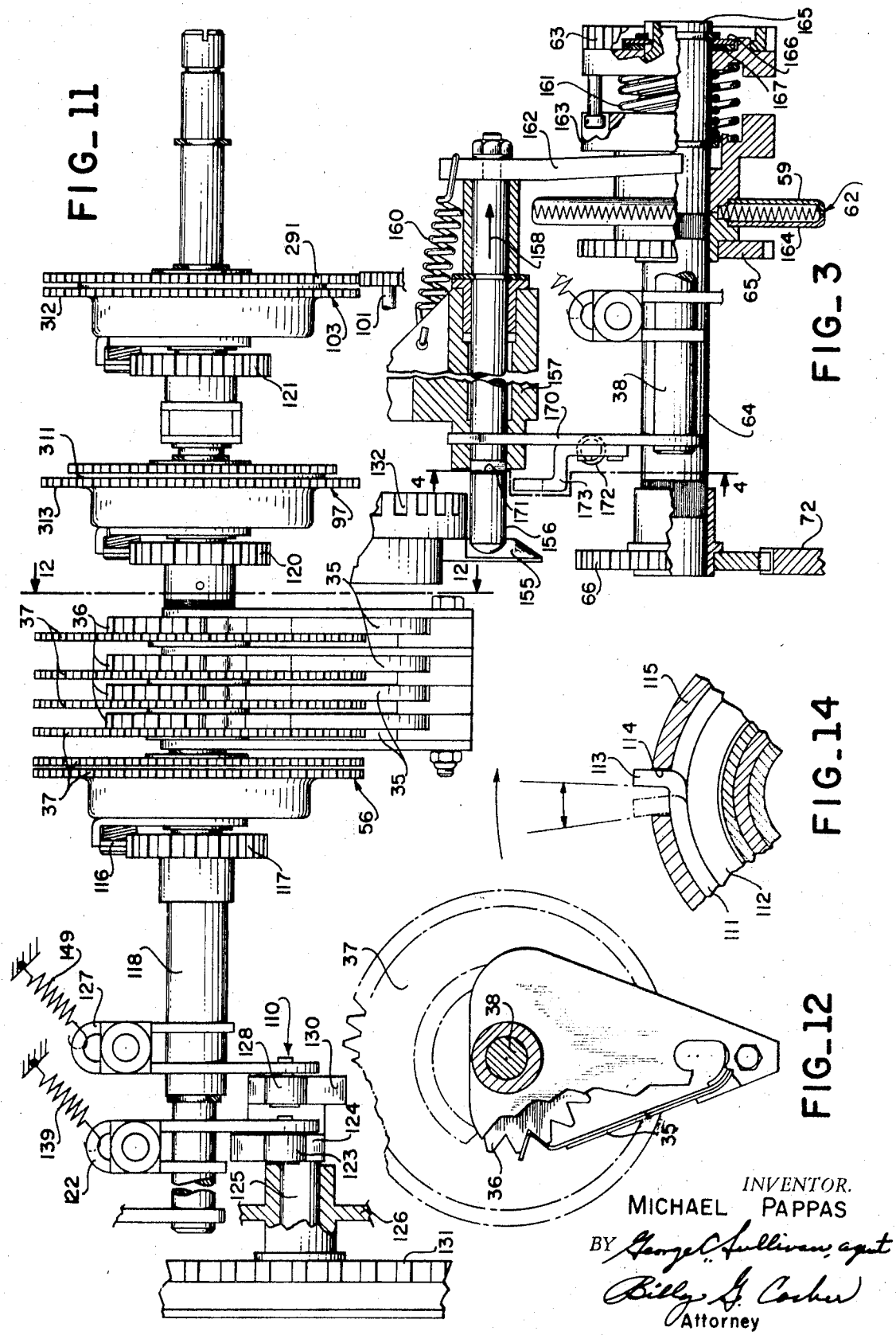

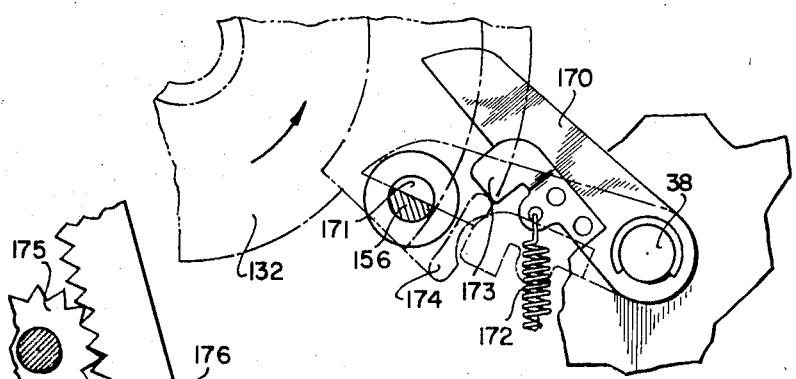
FIG_4
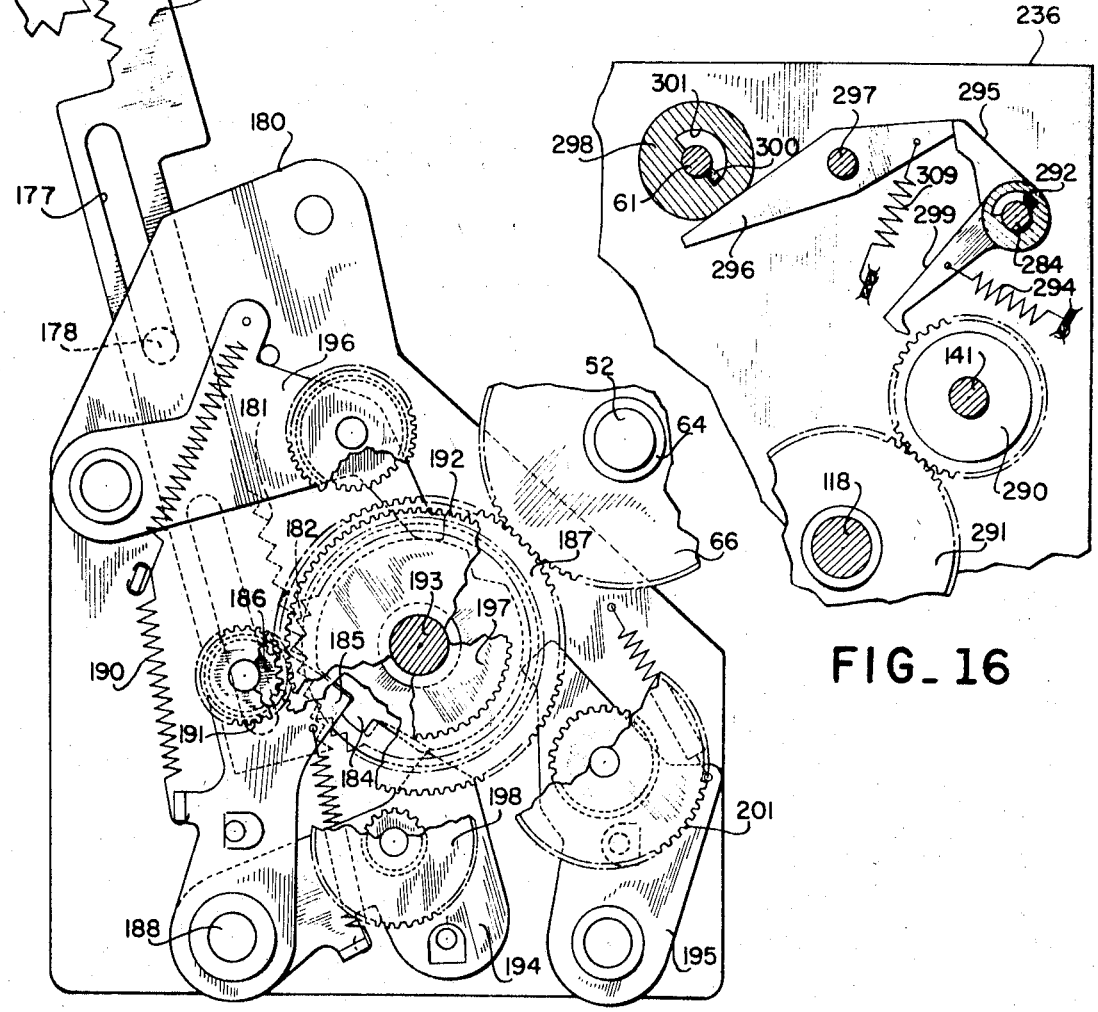
FIG_16
FIG_5

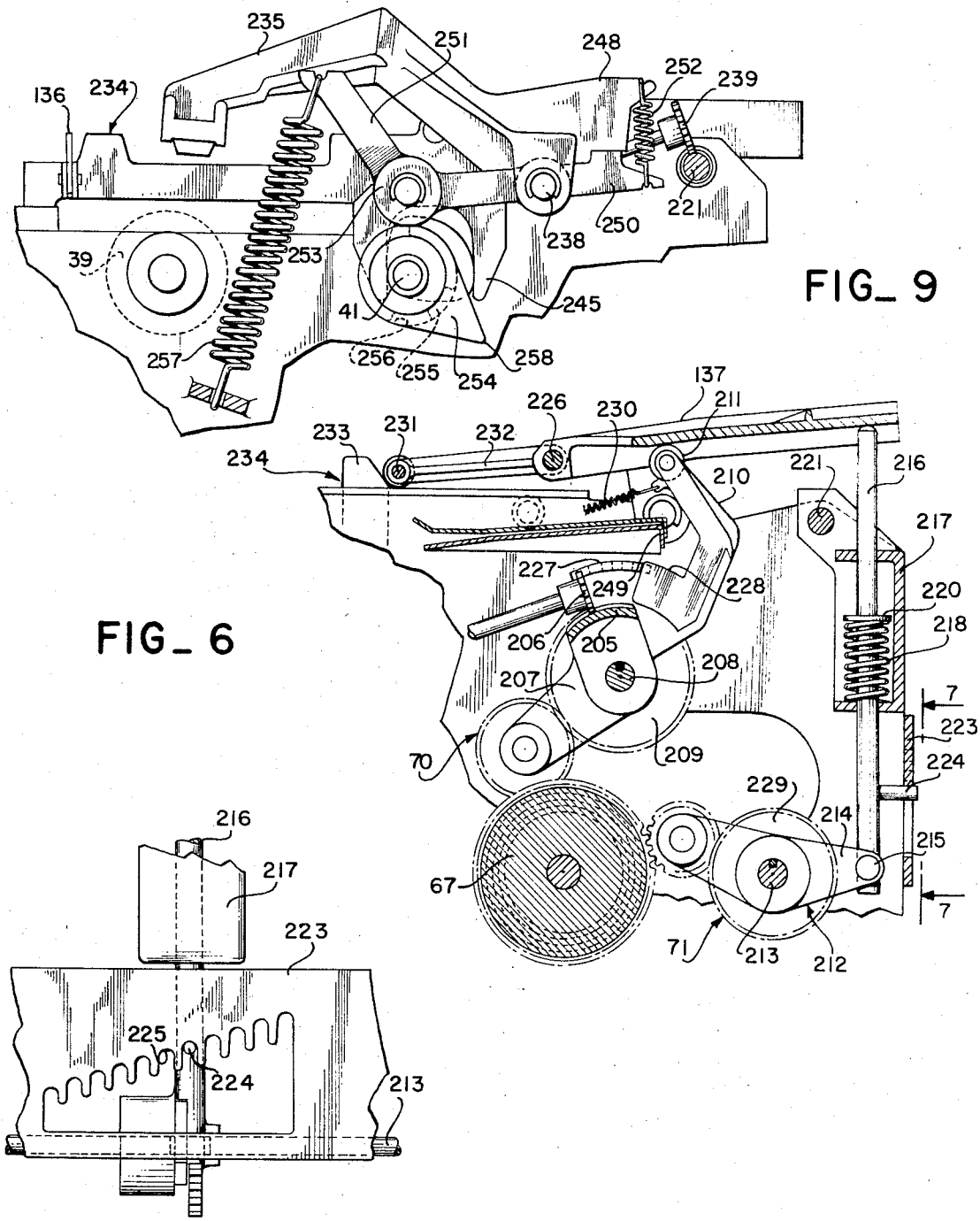

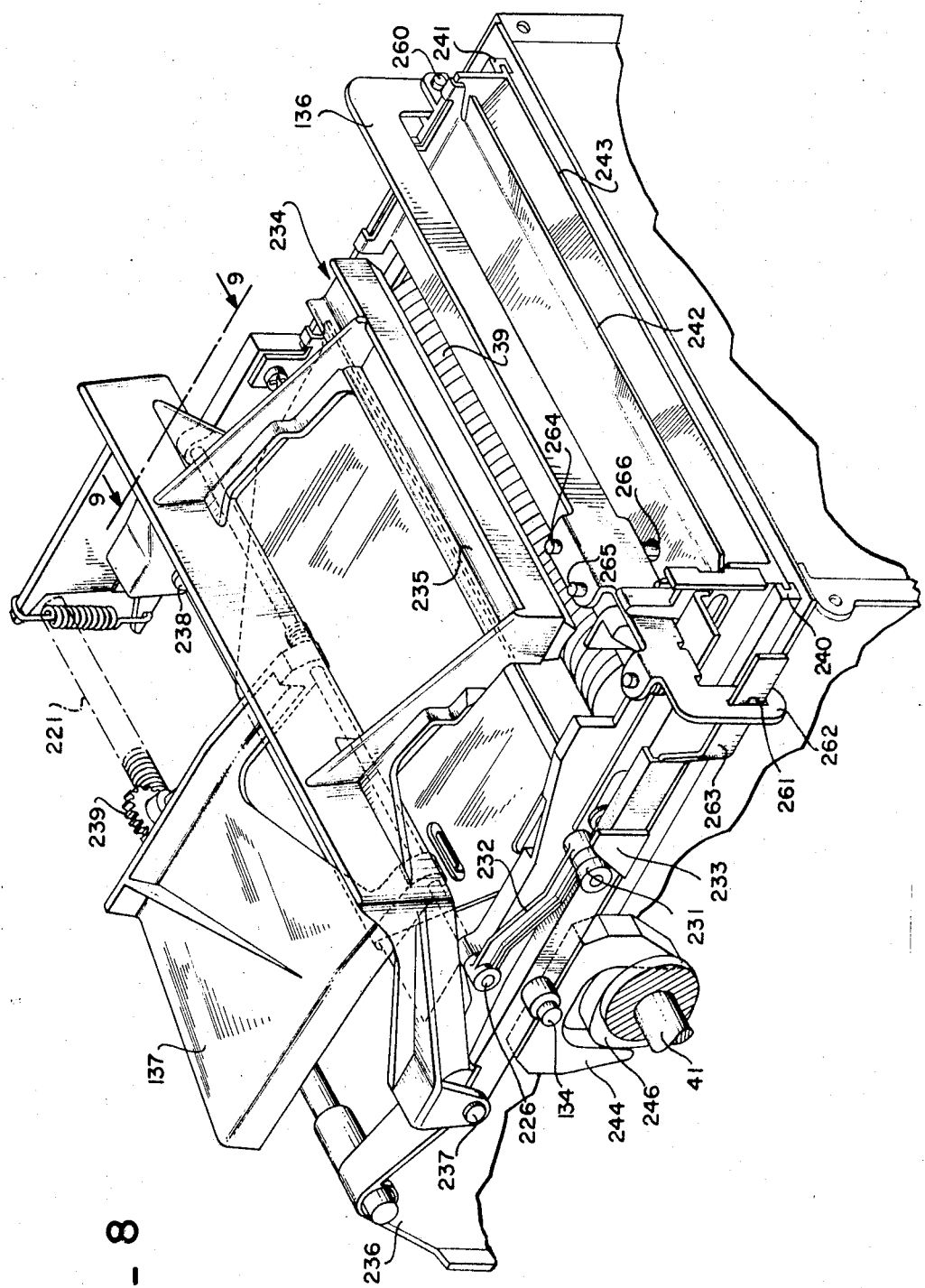

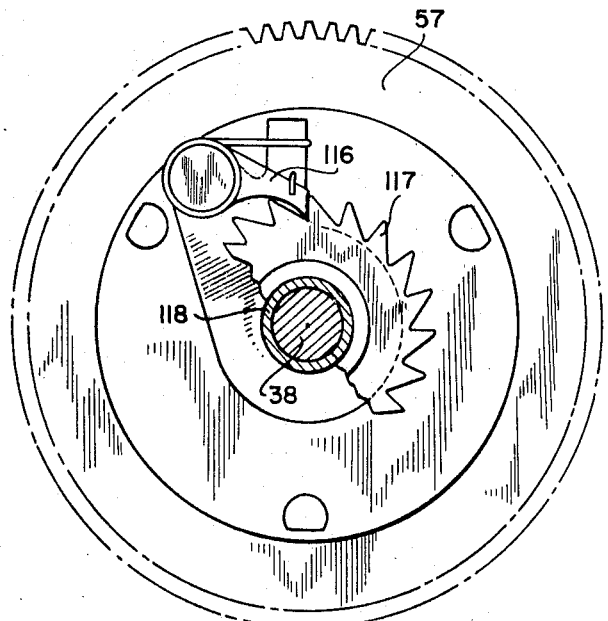
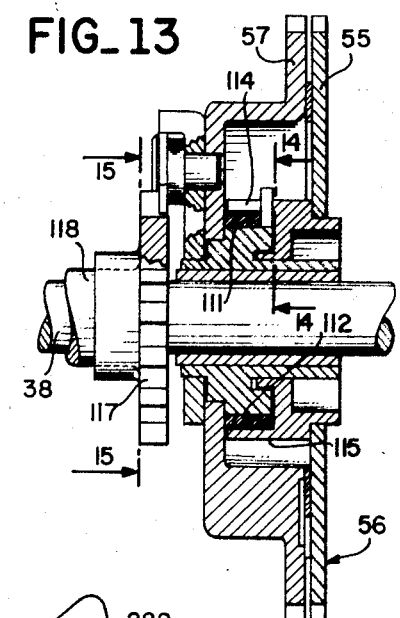
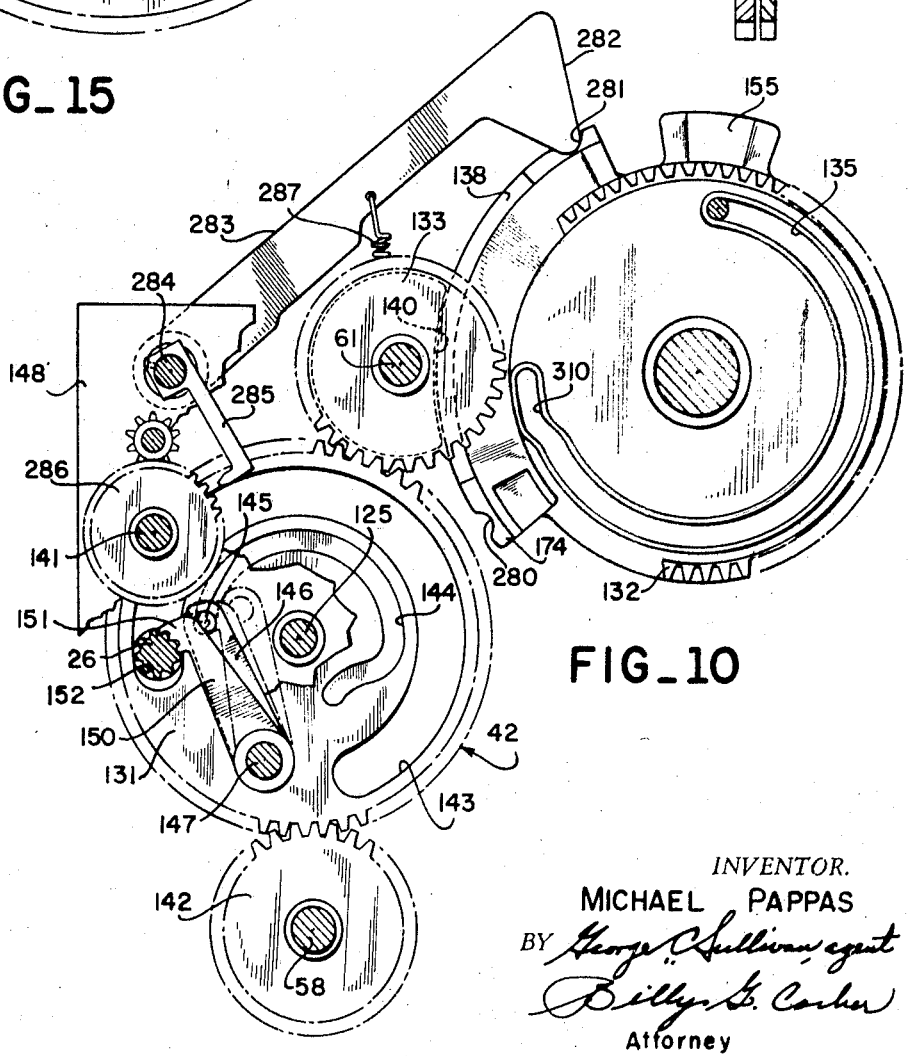

VARIABLE RATE COMPUTING AND RECORDING REGISTER

BACKGROUND OF THE INVENTION

This invention relates to combination computing and recording registers for use with flowmeters wherein the flow and measurement of a delivered product is continuous, resulting in an analogue-type input to the computing register in the form of a shaft rotation. The input is typically accumulated on integrating digital counters and displayed in the form of quantity and price information. The price per quantity unit, tax rate, product code and the like may be set into the register by the operator prior to beginning a delivery and printed out on a recording sheet along with the quantity and price information for billing purposes to conclude each transaction.

With such a device, delivery can stop at any arbitrary value, and the least significant digit wheels of the integrating digital counters can therefore stop between digits. Where these counters are for visual display of the output of the register, it is possible to read the results with sufficient accuracy by simply interpolating between least significant digits. However, where the counters must print the results on a recording sheet, the digits must all be aligned, resulting in a round-off to the nearest quantity and monetary units.

In the prior art as represented by U.S. Pat. No. 3,121,531, for example, there is disclosed a variable rate computing and recording register for printing out on a recording sheet quantity and price information for billing purposes. Computation in that device is performed by multiplying the measured amount by the price per quantity unit. Both the computed price and the quantity measurement must be rounded off to align the digits on the print wheel counters for printing. This is accomplished in the above patent by simultaneously and independently advancing the quantity and price counters. This can result in a discrepancy between the printed price and the correct computation based on the gallons printed, although it would always be correct based on the gallons actually delivered. The amount of the discrepancy may vary as much as three monetary units for a price per monetary unit of 60, and as much as one monetary unit for a price per monetary unit of 20. Since the consumer normally sees only the printed ticket, this represents in his view an error in computation. A one-cent error as associated with a price per monetary unit of 20 may be acceptable, but the larger apparent errors associated with higher prices per monetary unit would be objectionable, if not commercially unacceptable.

SUMMARY OF THE INVENTION

The computing and recording register of this invention is intended for multiproduct use and is accordingly provided with an extended price range capability such as for the delivery of various petroleum products. Also, a variety of tax rates, including a zero rate, may be selected for each transaction as well as a product code number for each of a number of products. The changes in price per unit quantity, tax rate and product code number may be made conveniently by an operator prior to the start of each delivery. A knob attached to either side of a selector shaft is used in making the settings. The shaft is made to move axially for selecting the particular variable to be altered and rotated to obtain the proper setting for such variable. An interlock mechanism prevents the operator from altering the settings after a delivery is begun, and therefore a delivery cannot be carried out at a rate other than that printed on the ticket or recording sheet. It is one of the objects of this invention to provide such a selecting and interlock mechanism for computing and recording registers of the type herein disclosed.

It is another and primary object of this invention to provide a computing and recording register wherein the advance of the quantity and the price-tax counters occurs sequentially in two stages with the quantity counter advance occurring first and driving the price-tax counters through the computer section of the device. Between the first and second stages, the computer section and hence the price-tax counters are uncoupled from the quantity counter. During the second stage, the price-tax counters are advanced to align the digits, as was the quantity counter during the first stage, for printing the output of the register on a recording sheet. Thus, the price computation is forced in all cases to agree with the printed gallons figure.

Another object of this invention is to provide a computing and recording register with a reset mechanism which includes a price interlock and friction clutch means to remove backlash in the computer section of the device and permit the successful use of loose-fitting, large tolerance parts capable of being economically manufactured.

Further and other objects become apparent from a reading of the following detailed description, especially when considered together with the accompanying drawings wherein like numerals refer to like parts.

BRIEF DESCRIPTION OF THE DRAWINGS

FIG. 1 is a front view of the computer and recording register with a portion of the housing cut away to expose portions of the reset mechanism;

FIG. 1A is a view taken on line 1—1 of FIG. 1;

FIG. 2 is a view schematically showing the several gear trains making up the drive system in the computer and recording register for the quantity, price and tax counters;

FIG. 3 is a fragmentary sectional side view of the clutch for coupling the computer section price and tax counters of the register to the quantity counter;

FIG. 4 is a view taken on line 4—4 of FIG. 3;

FIG. 5 is a side view of the tens gear train selector assembly;

FIG. 6 is a side view showing the selector assembly for the units and tenths unit gear trains;

FIG. 7 is a view taken on line 7—7 of FIG. 6;

FIG. 8 is a isometric view of the movable platen and carriage assembly on the register for printing output data on a recording sheet;

FIG. 9 is a view taken on line 9—9 of FIG. 8;

FIG. 10 is a view taken on line 10—10 of FIG. 1;

FIG. 11 is a view showing the print counter aligning shaft and related drive body parts carried on the shaft in the register;

FIG. 12 is a view taken along line 12—12 of FIG. 11;

FIG. 13 is a sectional view of a drive body on the print counter aligning shaft;

FIG. 14 is a view taken along line 14—14 of FIG. 13;

FIG. 15 is a view taken along line 15—15 of FIG. 13; and

FIG. 16 is a view taken along line 16—16 of FIG. 1.

DESCRIPTION OF THE PREFERRED EMBODIMENT

Referring to FIG. 1, computing and recording register 20 includes a housing 21 having a plurality of apertures 22 formed therein for observing nonresettable visual display counter 23 which accumulates total quantity units, such as gallons of fluid delivered in all transactions, resettable visual display counter 24 which accumulates quantity units per transaction, and a series of display wheels 25 indicating the selected price per quantity unit, the product code number and selected tax rate.

A selector shaft 26 is provided for selecting the desired price per quantity unit, tax rate and product code number, and for positioning display wheels 25 to visually indicate the settings. Manual control knob 27, which may preferably be equipped with an overload clutch (not shown) is secured to one end of shaft 26 externally of housing 21 for rotating the shaft. Shaft 26 is axially movable as well as rotatable to a plurality of discrete positions, in which a drive pin 28 on shaft 26 meshes with teeth formed by a series of grooves 29, as indicated in FIG. 1A, in any one of the plurality of gears 30 for moving the individual display wheels 25. A detent, such as split spring washer 31 held by frame 32 and retained on shaft 26, cooperates with a series of grooves 33 formed around the shaft to define a different discrete axial position of the shaft for each display wheel 25. There are preferably ten discrete rotational positions for shaft 26, one for each number 0 through 9 on display wheels 25, and these discrete positions may be provided by spring detents 35 riding the teeth of associated ratchet wheels 36 secured to idler gears 37 individually journaled on shaft 38, as best shown in FIGS. 11 and 12. These idler gears are for the purpose of coupling display wheels 25 to corresponding print wheels 39 (FIG. 8) such that the print wheel is always positioned to print a number which corresponds to that displayed to the operator on display wheel 25. The idler gears also serve to couple selector shaft 26 and display wheels 25 to the price and tax rate selection mechanisms in the computer section of the register, as more particularly described hereinafter in connection with FIGS. 2, 5, 6 and 7.

Also shown in FIG. 1 is a manual reset knob 40 secured to a drive shaft 41 externally of housing 21. Within housing 21, drive shaft 41 carries a gear assembly 42 which drives a series of cams and levers, as hereinafter described in detail in connection with FIGS. 2, 4, 8 through 11 and 13 through 16, for performing various before-delivery and after-delivery operations of the register. Reset knob 40 is rotated by the operator to transfer from the before-delivery mode which allows the register to receive a recording sheet 43 through slot 44 formed in housing 21, to a delivery mode in which the recording sheet is locked in position, and the register is otherwise conditioned for computing a delivery. Rotation of reset knob 40 in the opposite direction in the after-delivery mode returns the register to its before-delivery mode and performs necessary after-delivery functions, including printing a record of the transaction on a recording sheet following each delivery, all as hereinafter particularly described.

Computing register 20 in the form disclosed herein is intended for use with a meter (not shown) of the type having an output shaft 45 which rotates proportional to the metered quantity. Output shaft 45 of the meter engages a fork 46 or other suitable coupling device exposed through an opening formed in the underside of housing 21. Fork 46 is secured to a shaft 47 rotatably journaled on supporting structure 48 forming part of frame 32. A drive gear 49 on shaft 47 forms part of an input gear train 50 driving the computer section of the register schematically shown in FIG. 2.

In describing FIG. 2, brief reference will be made to FIGS. 3 through 16 as appropriate to show correspondence between the specific structure and that schematically shown in FIG. 2. Thereafter, the specific structure will be considered in further detail.

It is seen in FIG. 2 that input gear train 50 includes a shaft 52 having two drive gears 53 and 54. Drive gear 53 is coupled to visual display counter 24 which is resettable on shaft 58 to indicate the total quantity units or gallons delivered per transaction. Drive gear 54 meshes with input gear 55 of a drive body 56, shown in detail in FIGS. 11, 13, 14 and 15. Drive body 56 has an output gear 57 engaging a quantity print counter 60 on shaft 61. Print counter 60 is represented in FIG. 8 by a group of the print wheels 39 and, like counter 24, it is resettable to indicate the total quantity units or gallons delivered per transaction. Both visual counter 24 and print counter 60, as well as the other counters employed in the register, are integrating digital counters well known in the art and available as standard commercial items in the open market.

Drive gear 54 also drives nonresettable visual display counter 23 through input gear 55 of drive body 56 to accumulate a count of the total quantity units delivered through the meter for all transactions rather than on a per transaction basis.

Output gear 57 on drive body 56 couples quantity print counter 60 to clutch plate 59 of a clutch 62 through gear 63. The specific construction of clutch 62 is shown in FIG. 3 and will be later described in detail. It should be sufficient at this point to simply state that clutch 62 drives gears 65 and 66 through a sleeve 64 journaled on shaft 52. Gear 65 drives a cone gear 67 journaled on shaft 68. The cone gear forms part of a tenths unit price selector gear train 70 and a units price selector gear train 71 in the computer section of the register, as more particularly shown in FIGS. 6 and 7. Gear 66 drives a tens unit price selector gear train 72, shown schematically in FIG. 2 and in detail in FIG. 5. The output of tens unit price selector gear train 72 is combined with the output of the tenths unit price selector gear train 70 in differential 73. The combined tens and tenths unit output of differential 73 is obtained as a rotation of shaft 68 drives one side of a second differential 74. The other input to differential 74 is the units price increment obtained from gear train 71. Rotation of shaft 75 at the output of differential 74 accumulates the price per quantity unit before taxes. The tax, if any, must be added to this interim total.

Any one of several different tax rates, including a zero tax rate, is available through a tax rate selector gear train 80. Gear 81 on shaft 75 drives a series of gears 82, 83, 84 and 85, each of a different diameter and secured to common shaft 99. Gears 83, 84 and 85 mesh with selector gears 86, 87 and 88. Selector gears 86, 87 and 88 are rotatably carried on levers 90, 91 and 92, each journaled on a common shaft 93 such that selector gears 86, 87 and 88 may be each selectively moved by its associated lever 90, 91 or 92 to engage tax rate output gear 94. A cam 89 on shaft 26, as shown in FIG. 1, may be employed to remotely control the position of levers 90, 91 and 92. Each selector gear 86, 87 and 88 may represent a different desired tax rate in terms of a percentage of the price per quantity unit, and when all three of the selector gears are held out of engagement with gear 94, a no output or zero tax rate is obtained from tax rate selector gear train 80. It will of course be recognized that other variable ratio gear trains may be used in place of the tax rate selector gear train schematically shown in FIG. 2 to change computer section gain, and the tens unit price selector gear train 72 shown in FIG. 5 is one such example. Output gear 94 of the tax rate selector gear train 80 drives a tax print counter 95 through suitable gearing 96 and a drive body 97, which drive body may be functionally identical to drive body 56 shown in detail in FIGS. 11, 13, 14 and 15.

Tax rate output gear 94 also drives one side of a differential 98 through gearing 100. The other input to differential 98 is supplied by shaft 75 which accumulates price per quantity unit. Hence, the output of differential 98 represents the price per quantity unit adjusted to include the tax at a rate selected by the operator. This output appears at shaft 101 as a shaft rotation which is transferred to price print counter 102 through drive body 103. Drive body 103 is of the same or similar construction as drive bodies 56 and 97, as shown in detail in FIGS. 11, 13, 14 and 15.

It is a primary function of drive bodies 56, 97 and 103 to perform, in cooperation with clutch 62 (FIG. 3) and cam mechanism 110 (FIG. 11), the aligning or rounding off of the least significant digits of the print counters 60, 95 and 102 to the nearest full digit so that a readable record of the transaction may be made by the printing apparatus forming a part of the register and so that the printed price will agree with the correct computation based on quantity units or gallons printed.

Referring particularly to FIGS. 13, 14 and 15, input gear 55 and output gear 57 of drive body 56 are coupled by a spring 111 which is wrapped snugly around hub 112 of the output gear and bent radially outwardly at one end 113 thereof (FIG. 14) to project through a slot 114 formed in hub 115 of input gear 55. Spring 111 acts as a one-way clutch, causing the input gear to drive the output gear in one direction (counterclockwise as viewed in FIG. 15) but not in the other direction. It is also to be noted with reference to FIG. 14 that slot 114 formed in input gear 55 is enlarged to permit limited relative rotational movement between the input and output gears on the drive body. This limited relative rotational movement allows the associated print counter to lag its input gear train by one-half least significant digit at the start of delivery.

A spring-loaded pawl 116 is carried on output gear 57 of drive body 56, as best shown in FIG. 15, to engage a ratchet wheel 117 secured to sleeve 118 on shaft 38. Input and output gears 55 and 57 of drive body 56 are journaled on shaft 38 to rotate independently of the shaft in the normal counterclockwise direction (as viewed in FIG. 15) for driving its associated print counter. When sleeve 118 on shaft 38 is rotated in the same counterclockwise direction, ratchet wheel 117 will advance the drive body output gear 57 when pawl 116 rides down to butt against one of the ratchet teeth. By selecting the proper number of teeth on the ratchet wheel—normally double the number of digits on the least significant digit wheel of the print counter—and by having the least significant digit wheel lag the input gear train during the delivery, the alignment and round-off to the nearest digit for printing is automatically achieved, following the delivery by rotating shaft 38 an amount equivalent to one whole number of the least significant digit wheel or approximately 36° where the numbers 0 through 9 are equally spaced around the digit wheel.

The construction and operation of drive bodies 97 and 103 are identical to that just described for drive body 56 except that their associated ratchet wheel, 120 on drive body 97 and 121 on drive body 103, is secured to advance shaft 38 rather than sleeve 118, as best shown in FIG. 11. A price-tax advance lever 122 is secured to shaft 38 adjacent one end thereof and is provided with a cam follower wheel 123 for engaging price-tax cam 124 carried on shaft 125 journaled in frame structure 126. A quantity advance lever 127 is secured to sleeve 118 and is similarly provided with a cam follower wheel 128 for engaging quantity advance cam 130, also secured to shaft 125. Cam drive gear 131 is secured to shaft 125 externally of frame structure 126 for driving price-tax advance cam 124 and quantity advance cam 130. Springs 139 and 149 urge levers 122 and 127, respectively, in a direction to maintain cam followers 123 and 128 in engagement with their respective cams 124 and 130.

Referring to FIG. 10, cam drive gear 131 is coupled to sector gear 132 through gear 133. Sector gear 132 is secured to drive shaft 41 which is adapted to be rotated manually by reset knob 40, shown in FIG. 1. The relative size of gears 131, 132 and 133 (FIG. 10) are such that rotation of drive shaft 41 through an arc of nearly 270° from one extreme position to the other by a force applied manually through knob 40, will produce the required rotation of shaft 58, shaft 61 and cam shaft 125 to perform the several functions required of these shafts in the before and after delivery modes. As is apparent from FIG. 10, sector gear 132 is limited in its rotation by cam follower 134 riding in a cam slot 135 formed in the wall of gear 132. In addition to limiting the rotation of sector gear 132, cam slot 135 and pin 134 cooperate to actuate a recording sheet locking bar 136 and a selector gear deflector plate 137 on carriage 234, shown in FIG. 8. Still referring to FIG. 10, it is seen that sector gear 132 drivingly engages gear 133 throughout only a portion of its total travel and that a cam 138 is formed integral with sector gear 132 to mate with a cam 140 on gear 133 to lock shaft 58, shaft 61, gear 133, cam drive gear 131, shaft 125 and their associated mechanisms in a prescribed position at all times except during that portion of the rotation of drive shaft 41 in which sector gear 132 is in mesh with gear 133. Cam drive gear 131 drives gear 142 on shaft 58 which carries the resettable visual quantity counter 24, shown in FIGS. 1 and 2. A circular slot 143 formed in gear 131 allows selector shaft 26 to pass therethrough for manipulating the shaft from either side of the register without inhibiting the necessary rotational movement of gear 131. The cam slot 144 formed in gear 131 receives a cam follower 145 carried on lever 146. Lever 146 is secured to shaft 147 journaled in frame structure 148. A second arm 150 which is also secured to shaft 147 is notched at one end 151 thereof to engage splines 152 formed in shaft 26 for the purpose of locking the shaft against rotation at all times except at the beginning of the before-delivery mode of operation of the register, as hereinafter described. Splines 152 formed in shaft 26 extend throughout a sufficient portion of the length of the shaft, as shown in FIG. 1, to permit axial movement of the shaft in performing the price, product code and tax rate selection functions.

A clutch actuating cam 155 on sector gear 132, as best shown in FIG. 3, is arranged to engage a pin 156 journaled in frame structure 157 for relative axial movement, causing the pin to move in the direction of arrow 158. A bifurcated lever 162 is secured to one end of pin 156 and arranged to engage a flange 163, forming a part of the structure of clutch plate 59. By retracting pin 156 in the direction of arrow 158 against the action of spring 160, lever 162 compresses spring 161, allowing clutch plate 59 to move to the right as viewed in FIG. 3 and become disengaged from its mating clutch plate 164. Clutch plate 59 is fixed against relative rotation with respect to clutch input gear 63, which is driven by the output gear of drive body 56, as previously described in connection with FIG. 2. Hence, when clutch 62 is closed, that is, when the serrations on clutch plate 59 are in mesh with the serrations on clutch plate 164, rotation of gear 163 is transmitted to sleeve 64 and clutch output gears 65 and 66. When clutch 62 is held open against the action of springs 160 and 161, gears 65 and 66 are no longer coupled to gear 63 through clutch 62. However, means are provided for maintaining a predetermined friction coupling between gear 63 and the output gears of the clutch, even when the clutch is open for the purpose of eliminating backlash in the computer system. This friction coupling is achieved by extending sleeve 64 through the hub of clutch plate 59 and securing at end 165 thereof a friction plate 166 which engages a mating friction plate 167 secured to the hub of gear 63. Hence, when the clutch is open, a certain amount of friction drag is present to cause output gears 65 and 66 in the clutch assembly to tend to rotate with gear 63. The amount of the friction load is a matter of design, but preferably need not exceed that required to slightly overcome the normal friction loads in the computer section and various gear trains of the register.

Since the input to the register is a shaft rotation coupled to the computing section thereof through clutch 62, the clutch is engaged or closed during the delivery mode of operation. At the conclusion of delivery, it is desired to open clutch 62 only after quantity advance cam 130 has rotated sleeve 118 and performed the rounding off function in connection with quantity print counter 60 and before the price and tax print counters are advanced. The necessary sequencing of these operations to advance the quantity, price and tax print counters with the opening of clutch 62 is achieved by properly locating cam 155 on sector gear 132 (FIG. 10) to establish the proper phase relationship between the rotation of shaft 125 and the point at which cam 155 engages pin 156.

A latch lever 170 journaled on shaft 38 is swingable into engagement with a notch 171 in pin 156, as best shown in FIGS. 3 and 4, to hold clutch 62 open once it is moved to the open position by the action of cam 155. Latch lever 170 is spring urged in the direction of pin 156 by a spring 172. A pawl 173 secured to lever 170 and spaced laterally therefrom is arranged to be engaged by a detent 174 on sector gear 132, as best shown in FIGS. 4 and 10, for retracting the latch lever 170 and allowing clutch 62 to close. This closing or engaging of clutch 62 is made to occur just prior to reaching the delivery mode of operation of the register and during the before-delivery mode hereinafter described in further detail.

As explained earlier in connection with FIG. 1, computing and recording register 20 features price, product code and tax rate selector mechanisms permitting these variables to be changed by manipulating a control knob 27 available to an operator externally of the register. In the case of the tens unit price selector gear train 72, which is shown in detail in FIG. 5, a pinion gear 175 engages a rack 176 having slots 177 for guided movement on pins 178 carried on frame 180. Teeth 181 on rack 176 mesh with a gear 182 on shaft 183 so that as rack 176 is translated within the limits of the pin and slot connection with frame 180, gear 182 will be rotated. A compound cam 184 on gear 182 is rotated with the gear by rack 176 to any of a plurality of predetermined rotational positions wherein a cam follower, such as cam follower 185, falls into a notch in the cam allowing a selected tens unit gear 186 to engage gear 187 which is coupled to and driven by gear 66 of clutch 62 (FIG. 3). Gear 186 is mounted on cam follower 185, which in turn is swingably carried on frame 180 through pin 188. A spring 190 acting between cam 185 and frame 180 urges the cam follower into engagement with cam 184 to positively shift the gears into meshed engagement on proper alignment of the cam with the cam follower. Transfer gear 191 on cam follower 185 is driven by gear 186. An output gear 192 on shaft 193 is rotated by transfer gear 191, causing shaft 193 to rotate at a selected speed ratio with respect to the rotation of drive gear 66 representing the input to the tens unit price selector gear train assembly 72. A plurality of additional cam followers 194, 195 and 196 are swingably carried on frame 180 in a manner similar to that just described for cam follower 185. These additional cam followers carry gears of different diameter which are arranged to selectively drive output shaft 193 of the tens unit gear train at the different rates representing the different tens unit price increments. Due to physical constraints in the gear train assembly, a companion gear 197 to gear 192 may be provided to engage certain of the transfer gears, such as 198 and 201, on cam followers 194 and 195 where these gears are in a plane laterally displaced from the plane of transfer gear 191, for example. These transfer gears all serve the common purpose of transferring shaft motion from the input gear 187 to the output gears 192 and 197 on shaft 193 at any one of several available speed ratios selected by an operator through linear displacement of rack 176. When shaft 193 is held stationary, the tens unit output setting represents zero.

Referring now to FIGS. 6 and 7, tenths unit price selector gear train 70 and units price selector gear train 71 are variable in increments 0 through 9 by engaging different diametral portions of stepped cone gear 67. Lateral movement of tenths unit price selector gear train 70 relative to the cone gear is effected by a rack 205 and pinion 206 driven by shaft 26 (FIG. 1) through one of gears 37 (FIG. 11). Rack 205 is formed on a lever 207 journaled for free rotation on spline shaft 208 and arranged to be moved axially of the shaft on rotation of pinion gear 206. One end 210 of lever 207 carries a roller 211 adapted to be engaged by selector gear deflector plate 137 for rotating the lever about shaft 208 to disengage the tenths unit price gear train 70 from cone gear 67 before making an incremental price change. Gear 209 in gear train 70 is keyed to the spline in shaft 208 to rotate the shaft in driving differential 73 (FIG. 2) while being movable axially therealong to different diametral portions of cone gear 67.

Units price gear train 71 includes lever 212 journaled on spline shaft 213 for free axial and rotational movement into and out of engagement with cone gear 67 in a manner similar to that described above in connection with tenths unit price gear train 70. One end 214 of lever 212 is pinned at 215 to a push rod 216 projecting through openings in a supporting bracket 217 which confine the push rod to linear axial movement. A spring 218 concentric with rod 216 between frame 217 and a retaining washer 220 normally urges rod 216 in an upward direction, as viewed in FIG. 6, urging gear train 71 into engagement with cone gear 67. The free upper end of push rod 216 is adapted to engage the underside of plate 137 and be depressed by the plate for disengaging the units price gear train 71 from the cone gear. Frame 217 is secured to a grooved rack 221 adapted to be moved axially by pinion 239 (FIGS. 8 and 9) by manually rotating shaft 26 (FIG. 1) when indexed with the units price gear among the group of gears 30, shown in FIG. 1. Axial movement of grooved rack 221 causes frame 217 to move laterally with it, carrying push rod 216 and gear train 71. Gear 229 in gear train 71 is keyed to the spline in shaft 213 to rotate the shaft while being movable therealong to different segments of the cone gear. Shaft 213 is in the power train to differential 74 (FIG. 2).

Discrete lateral displacement of units price gear train 71 so as to engage the desired diametral portions of cone gear 67 is assured by the use of a detent plate 223, as shown in FIG. 7, where a pin 224 projecting from push rod 216 is adapted to be received in one of a plurality of notches 225 formed in the detent plate for aligning and locking the units price gear train 71 into proper alignment with respect to the desired diametral portion of stepped cone gear 67. Any of the discrete lateral positions defined by the notches and representing the numbers 0 through 9 may be selected while push rod 220 is held depressed against the action of spring 218. When plate 137 is allowed to swing upwardly, as viewed in FIG. 6, about its hinge axis 226, pin 224 moves into one of the notches 225 of detent plate 223, locking gear train 71 in the selected lateral position with respect to the cone gear. A similar locking arrangement is provided for tenths unit price gear train 70 as represented by detent plate 227 and projection 228 on lever 207. It should also be noted in FIG. 6 that lever 207 is urged in the direction to engage cone gear 67 by spring 230.

Plate 137 is swingable about its hinge axis 226 by a cam follower 231 carried on a lever 232, forming a part of plate structure 137. Cam follower 231 engages a cam 233 on carriage 234. A platen 235, as shown in FIGS. 8 and 9, is swingably carried above carriage 234 and print counters 39 on frame structure 236 by pins 237 and 238.

Referring more particularly to FIG. 8, carriage 234 is suitably supported on frame structure 236, such as by ways 240 and 241, allowing fore and aft movement of the carriage. A pair of spaced plates 242 and 243 on carriage 234 are arranged to receive recording sheet 43 and support the same above print wheel counters 39 and beneath platen 235 in the proper position for receiving printed information on actuation of the platen, in a manner similar to that disclosed in U.S. Pat. No. 3,121,531. The aft end of plates 242 and 243 are joined at 249 (FIG. 6) to provide a positive stop for the recording sheet inserted therein. The spaced plates at the open end are flared outwardly to index with slot 44 in the computing register housing shown in FIG. 1 and to facilitate insertion of the recording sheet into the computing register for recording the computed data.

Yokes 244 and 245, one on either side of carriage 234 as shown in FIGS. 8 and 9, engage cams 246 and 247, respectively, on drive shaft 41 to control and time the fore and aft movement of carriage 234 in relation to other before and after-delivery operations described herein.

It is the function of platen 235 to urge recording sheet 43 into engagement with print counters 39 for making a recording. As best shown in FIG. 9, platen 235 is provided with an extension member 248 which is adapted to butt against an extension member 250 on platen actuating lever 251. Lever 251 is swingably carried on pin 238. A tension spring 252 acting between extension members 248 and 250 urges the two members into the abutting relationship shown so that swinging movement of actuating lever 251 about shaft 238 will cause corresponding movement of platen 235 about pins 237 and 238. Lever 251 carries a roller 253 arranged to engage platen actuating cam 254. Cam 254 is carried on drive shaft 41 and allowed limited rotational movement relative thereto by means of a pin 255 and slot 256 coupling like that described in the above-mentioned U.S. Pat. No. 3,121,531. A tension spring 257 at the outer end of platen actuating lever 251 urges roller 253 into engagement with cam 254 to support platen 235 in a suspended or neutral position out of contact with a recording sheet 43 when inserted between the space plates of movable carriage 234. Rotation of drive shaft 41 causes tooth 255 to engage the cam 254 and rotate the latter until high point 258 of cam 254 has raised the platen and roller 253 past the top dead center position. As cam 254 passes top dead center, the spring force on the platen urges the platen downward toward the recording sheet, causing cam 254 to lead shaft 41. The platen picks up momentum as cam 254 falls freely to its minimal position, and this momentum of platen 235 causes it to pass its neutral position, stretching spring 252 and forcing the recording sheet against the print counters 39 to record the indicia appearing on the counters. The energy of tension spring 252 then returns platen 235 to its neutral position spaced from the recording sheet and counters 39.

It is desirable to lock recording sheet 43 in the register during each delivery to assure that a true record will be made of the transaction. This is accomplished with locking bar 136 which is hinged by pin 260 on one side of carriage 234. A slot 261 formed in the other end 262 of locking bar 136 receives actuating lever 263 hinged to frame structure 236 at pin 237. Actuating lever 263 is rocked about pin 237 by cam follower 134 riding in cam slot 135 formed in sector gear 132 (FIG. 10). Only when sector gear 132 is rotated to the extreme position other than that shown in FIG. 10 are actuating lever 63 and locking bar 136 rised to permit the insertion or removal of a recording sheet from the register. A pair of spring-loaded pins 264 and 265 are carried on locking bar 136 to project through openings 266 formed in upper plate 242, as shown in FIG. 10, to resiliently engage the recording sheet and hold the same firmly in position between plates 242 and 243.

Referring to FIGS. 10 and 16, the register is provided with an interlock system controlled in part by lever 283 secured to shaft 294 (FIG. 10). Latch 285, secured to shaft 284, is held out of engagement with gear 286 on nonresettable visual quantity counter 23 at both extreme positions of sector gear 132. At these two extreme positions, detent 282 engages recess 280 or 281 to hold latch 285 away from gear 286. However, at all intermediate positions of sector gear 132, latch lever 283 is allowed to rotate sufficiently in a clockwise direction as urged by spring 287 to cause latch 285 to engage gear 286 and hold the same against rotation. This effectively locks the input gear train 50, illustrated in FIG. 2, substantially throughout both the before-delivery and after-delivery modes.

With the supplemental locking mechanism shown in FIG. 16, the computer section of the register is also locked throughout essentially the entire before-delivery mode and a lesser portion of the after-delivery mode. An idler gear 290 on shaft 141 is selectively engaged by latch 299 on the same shaft 284 as latch 285 to prevent rotation of price drive body input gear 291. A pin 292 on shaft 284 rides in a slot 293 formed in the hub of latch 299, while spring 294 urges the latch towards an extreme position engaging idler wheel 290. The latched condition exists throughout most of the before-delivery mode. However, rotation of shaft 284 by latch lever 283 to the raised position shown in FIG. 10 at either extreme position of sector gear 132, is effective to disengage latch 299 from gear 290.

In the after-delivery mode, arm 295 on latch 299 is arranged to butt against cam follower lever 296 pivotally carried on shaft 297 for holding latch 299 disengaged from gear 290 only throughout the first stage of the two-stage advance of print counters 39. Cam 298 on shaft 141 controls the actuation and timing of cam follower lever 296. Spring 309 forces the cam follower lever against the cam. To provide the desired dwell of lever 296 for holding latch 299 out of engagement with gear 290, a pin 300 and slot 301 arrangement is employed in coupling cam 298 to shaft 61. This is needed primarily because shaft 61 is the reset shaft for print wheel counters 39 and is rotated slightly over one full turn to perform the counter reset operation while substantially less rotation is needed for proper actuation of cam follower lever 296.

Computing and recording register 20 has three distinct operating modes, and these are referred to herein as the before-delivery mode, the delivery mode and the after-delivery mode. The drawings show the register in the delivery mode. At the beginning of the before-delivery mode, sector gear 132 is in the extreme position opposite that shown in FIG. 10, wherein detent 282 rests in recess 280. At this stage, the register will receive a recording sheet 43 and allow the necessary adjustments, if any, to be made in the price, produce code and tax rate settings. It is at this beginning of the before-delivery mode, and only this mode, that latch lever 150 (FIG. 10) is held out of engagement with splines 152 on shaft 26 so that shaft 26 may be rotated and translated with knob 27 by an operator to make appropriate changes in the price, product code and tax rate settings. At this stage of the before-delivery mode, carriage 234 (FIG. 8) is in its most forward position wherein cam follower 231 is positioned atop cam 233, causing plate 137 to depress push rod 216 and lever 207 and retract gear trains 70 and 71 out of engagement with cone gear 67 (FIG. 6), allowing these gear trains to be moved laterally relative to the cone gear to different diametral portions thereof representing different price increments. The tens unit gear train 72 and tax rate gear train 80 may also be readjusted at this time by manipulation of shaft 26.

After recording sheet 43 has been inserted in the register and the desired price, product code and tax rate adjustments made, the operator manually turns knob 40, shown in FIG. 1, to rotate shaft 41 in a clockwise direction, as viewed in FIG. 10, about three-quarters of a turn to reach the delivery mode position shown in FIG. 10. As knob 40 is rotated in the before-delivery mode towards the delivery mode position while clutch 62 is held open, the following events occur: (1) latches 285 and 299 engage gears 286 and 290 as lever 283 drops off cam 138 (FIGS. 10 and 16); (2) print wheel counter reset shaft 61 and visual price counter shaft 58 are rotated counterclockwise, as viewed in FIG. 10, to reset the counters to zero; and (3) drive bodies 56, 97 and 103 are conditioned for introducing the one-half least significant digit lag at the start of delivery. Clutch 62 in the computer section of the register remains open until just prior to reaching the delivery mode position when detent 174 engages latch lever 173 (FIGS. 4 and 10), causing latch arm 170 to disengage notch 171 in pin 156, at which time the force of spring 161 in the clutch assembly (FIG. 3) forces clutch plate 59 into engagement with clutch plate 164. During this mode and before clutch 62 closes, the friction through the open clutch as obtained through friction plates 165 and 167 drives the computer section against the stop provided by latch 299 to remove all backlash in the system and to cause price tumblers in the counters that may be out of engagement to drop into engagement. Thus, drive body 103 at the most remote end of the computer section drive system is locked throughout the initial phase of reset in the before-delivery mode, and it remains locked until the final stages of reset, causing the several gear trains to drive against the stop and remove any backlash in the system by the time the delivery mode is reached.

When sector gear 132 reaches the delivery position shown in FIG. 10, latches 285 and 299 are raised out of contact with their associated gears 286 and 290 by rotation of lever 284, as detent 282 rides up on cam 138 into recess 281. Cam follower lever 296 assumes the position shown in FIG. 16, butting against latch lever 295. Clutch 62 (FIG. 3) is closed, and as delivery of the metered quantity begins to rotate shaft 45 at the input to the register, the computer gear trains correspondingly begin to rotate. At this beginning of the delivery mode, detent 113 on spring clutch 111 is in the position shown in solid lines in FIG. 14 in each drive body 56, 97 and 103. The initial rotation of input gear 115 on each drive body does not pick up and drive output gear 112 until spring detent 113 has moved to the opposite side of slot 114, shown in dashed lines in FIG. 14. This introduces a lag of one-half least significant digit in the quantity, price and tax print counters 60, 102 and 95, respectively. Thereafter, the several computer section drive trains operate the several counters to perform the quantity, price and tax computations in accordance with the price per unit quantity and tax rate settings established in the before-delivery mode.

When the desired quantity of material is delivered, the operator shuts off the pump, or whatever, which drives shaft 45. Then, through knob 40 (FIG. 1), the operator rotates drive shaft 41 and sector gear 132 in a counterclockwise direction about three-quarters of a turn until pin 134 is bottomed in the opposite end 310 (from that shown in FIG. 10) of slot 135. It is this rotation of drive shaft 41 and sector gear 132 in a counterclockwise direction from the delivery position shown which constitutes the after-delivery mode of register operation.

Initial counterclockwise rotation of drive shaft 41 and sector gear 132 allows detent 282 to slide out of recess 281 and down off cam 138 (FIG. 10), thus causing shaft 281 to rotate in a direction causing latch 285 to engage gear 286 and effectively lock input gear train 50 (FIG. 2) of the register, including input gear 55 on drive body 56. Cam follower lever 296 dwells in the delivery position shown in FIG. 16, holding latch 299 out of engagement with gear 290. During the first segment or stage of the after-delivery mode, rotation of drive shaft 41, which is on the order of one-half the total travel for this mode, and gear train assembly 42 drives cam shaft 125 counterclockwise in FIG. 10 to rock sleeve 118 through cam 130 and cam follower 128 in a counterclockwise direction, as viewed in FIG. 15. As sleeve 118 is rotated in a counterclockwise direction in FIG. 15, output gear 57 of drive body 56 is advanced to align and round off the least significant digit in quantity print counter 60 to the nearest number for printing. In this rounding off and digit aligning process, the one-half least significant digit lag introduced at the start of the delivery is automatically compensated for so as to provide a quantity total on the quantity counter which is accurate to the closest least significant digit. This is, if the actual delivered quantity is 51.87 gallons, for example, the quantity print counter before advance will read 51.82 by interpolation and after advance will read 51.9 gallons. Similarly, if the actual delivered quantity is 51.84 gallons, for example, the print counter before advance will read 50.79 by interpolation and after advance, 51.8 gallons.

As cam 130 reaches its high point, cam 155 on sector gear 132 (FIG. 10) indexes with pin 156 (FIG. 3) and within a few degrees of rotation of drive shaft 41, pin 156 is retracted, uncoupling clutch 62. Until this occurs in the after-delivery mode, it is seen from FIG. 2 that quantity print counter 60 is coupled through the computer section with price and tax print counters 102 and 95. Hence, as the quantity print counter 60 is advanced to perform the rounding off function, it drives the price and tax gear trains through the computer to add to the price and tax counters an appropriate amount representative of the quantity increment addition.

On completion of the rounding off function for quantity print counter 60, price-tax cam 124 (FIG. 11) begins to rise and rotate shaft 38 for advancing price counter 102 and tax counter 95 in a manner similar to that just described for quantity counter 60. While output gear 312 in price drive body 103 and output gear 313 in tax drive body 97 are being driven by shaft 38 during the second stage of the after-delivery mode, the input gears 311 and 291 of the tax and price drive bodies are effectively locked by latch 299 engaging gear 290 on shaft 141. Actually, latch 299 moves into engagement with gear 290 at the conclusion of the first stage advance and remains locked until the after-delivery mode is completed. Throughout this second stage advance phase of the after-delivery mode, clutch 62 (FIG. 3) is preferably held open by latch 170 engaging notch 171 in pin 156. The action of drive bodies 97 and 103, combined with the locking of the price and tax gear trains with latch 299, allows the price and tax counters to advance and align the digits as required for the printing operation while holding the numerical position established for the quantity print counter in the first stage advance phase. Consequently, the printed price will always agree with the printed quantity.

During the after-delivery mode, carriage 234 moves forward on rotation of drive shaft 41 to position recording sheet 43 for making a record of the transaction. Near the conclusion of the second stage advance, when price and tax counters 102 and 95 are being rounded off to the nearest tenths unit or tenth of a cent for printing, platen 235 is raised by cam 254 on drive shaft 41, and when the cam reaches its top dead center position at the conclusion of the second stage advance, spring 257 vigorously pulls the platen down, forcing the recording sheet against print counters 39 and causing a recording to be made of the transaction. Platen return spring 252 almost immediately thereafter restores the platen to a neutral position above the counters and recording sheet. The after-delivery mode is substantially completed at this point. However, rotation of drive shaft 41 a few more degrees to lift cam follower 134 into the high portion 310 of slot 134 (FIG. 10) raises lever 263, and this in turn releases recording sheet 43 from retaining pins 264 and 265 on locking bar 136.

As sector gear 132 (FIG. 10) reaches its extreme counterclockwise position, lever 283 is raised and detent 282 seated in recess 280 on cam 138. This unlocks shaft 141 as well as shaft 26, and as soon as the recording sheet is removed the register is ready to begin another before-delivery mode in preparation for computing and recording another transaction.

While a specific embodiment has been shown and described, it is for purposes of illustration rather than limitation. It is accordingly to be understood that certain alterations, modifications and substitutions may be made to the instant disclosure without departing from the teachings of this invention, as defined by the spirit and scope of the appended claims.

I claim:

1. A computing register comprising: an input shaft rotatable to represent a metered quantity, first digital counting means coupled to said input shaft and adapted to be driven by said shaft for accumulating quantity units incrementally, drive means, second digital counting means coupled to said first digital counting means through said drive means for accumulating monetary units incrementally, and actuator means for serially moving the first and second digital counting means to round off and align said counting means to the nearest least significant digit, said drive means being operable to allow only one of said digital counting means to be moved by said actuating means independently of the other digital counting means whereby the accumulation of monetary units is made to agree with the accumulation of quantity units.

2. A device as defined in claim 1 wherein said counting means are print counters, and said device includes a carriage for supporting a recording sheet approximate said print counters, and platen means operable in timed relation to said actuator means for pressing said recording sheet against said print counters for making a recording of the accumulated quantity and monetary units.

3. A device as defined in claim 2 wherein said carriage is movable, and said device includes a drive shaft manually rotatable between two extreme positions for establishing the desired sequence of operations for said device and causing a recording to be made both before and after each transaction.

4. A device as defined in claim 1 wherein movement by said actuator means is in a direction to advance said counter means, and said device includes latch means for positively holding said other digital counting means from advancing when said one digital counting means is independently advanced.

5. A device as defined in claim 1 wherein said drive means includes at least one variable ratio gear train, and selector means for adjusting said variable ratio gear train to establish any one of a plurality of different discrete monetary values per quantity unit.

6. A device as defined in claim 5 wherein said drive means includes a variable ratio gear train for adding an appropriate tax percentage to the accumulation of monetary units.

7. A device as defined in claim 5 wherein said selector means includes a selector shaft accessible to an operator externally of the device for changing to different discrete monetary values per quantity unit.

8. A device as defined in claim 7 wherein said selector shaft is movable both axially and rotationally to perform its function.

9. A device as defined in claim 8 including means for automatically locking said selector shaft against rotation to preclude changing monetary values except in a before-delivery mode prior to each transaction.

10. A device as defined in claim 1 wherein said actuator means includes shaft means, and said drive means includes drive body means carried on said shaft means, said drive body means including output gear means coupled to said counting means, and ratchet means coupling said output gear means to said shaft means so as to permit unlimited rotation relative to said shaft means in said one direction and limited rotation to any one of a plurality of discrete relative positions in the opposite direction, and means for rotating said shaft means and establishing a predetermined timing sequence for moving said first and second digital counting means to align the digits.

11. A device as defined in claim 10 wherein movement by said actuator means is in a direction to advance said counting means, and said drive body means includes lost motion means coupling said counting means for introducing a one-half least significant digit lag in said counting means to facilitate rounding off the output of said counter means to the nearest least significant digit.

12. A device as defined in claim 1 wherein said actuator means for serially moving the first and second digital counting means includes cam follower means, coupling means between said cam follower means and said counting means, and cam means for rotating said cam follower means to move said counting means through said coupling means.

13. A device as defined in claim 12 wherein said second digital counting means is coupled to said drive means through said coupling means, and said coupling means includes a pair of gears one coupled to the other through a lost motion connection whereby a lag is introduced into said counting means for rounding off the counting means output to the nearest least significant digit by movement in a direction advancing said counting means.

14. A device as defined in claim 13 including clutch means coupling said first digital counting means to said drive means, a manually rotatable drive shaft, and cam means controlled by said shaft for operating said clutch means in timed relation with said actuator means.

15. A device as defined in claim 1 wherein said drive means includes an output gear, and said device includes clutch means coupling said first digital counting means to said drive means, reset means for resetting said second digital counting means to a start position and actuating said clutch means, latch means providing a stop for holding said output gear during actuation of said reset means, and friction means coupling said drive means to said reset means for urging said drive means against the stop to minimize backlash in said computer means.

16. A computing register comprising: input shaft means rotatable proportional to a metered quantity, an integrating digital counter, a gear train coupling said counter to said input means for accumulating numerical units proportional to said metered quantity, reset means for resetting said counter to a start position, latch means providing a stop for holding said gear train during actuation of said reset means, and friction means coupling said gear train to said reset means for urging said gear train against the stop.

17. A computing register comprising, an input shaft rotatable proportional to a metered quantity, quantity counter means coupled to said input shaft for accumulating quantity units incrementally, variable ratio gear train means, clutch means selectively coupling said quantity counter means to drive said variable ratio gear train means, price counter means coupled to said variable ratio gear train means for accumulating monetary units, a manually rotatable drive shaft responsive to rotation in one direction for resetting said counters to a start position, cam means responsive to rotation of said drive shaft in a direction opposite said one direction for serially advancing said counters for rounding off the counter output to the nearest least significant digit, and means for actuating said clutch means in timed relation with said cam means and causing only said price counter to be driven by the other counter on rotation of said cam means in a direction to advance the other counter whereby the rounded off accumulation of monetary units is made to agree with the rounded off accumulation of quantity units.

18. A device as defined in claim 17 including selector shaft means accessible to an operator externally of the device for adjusting said variable ratio gear train means to select different discrete monetary values per quantity unit.

19. A device as defined in claim 18 wherein said counters are print counters, and said device includes a carriage for supporting a recording sheet in close proximity to said counters, and a platen movable on rotation of said drive shaft for pressing said recording sheet against said counters for making a record of the counter output.

20. A device as defined in claim 19 wherein said drive shaft is rotatable between two extreme positions to complete a delivery cycle, and said device includes means responsive to rotation of said drive shaft from one of said two extreme positions for positively retaining a recording sheet in said carriage until said drive shaft is returned to the one extreme position completing a delivery cycle.

21. A device as defined in claim 20 including means internal to the device for rendering said selector shaft means inoperative except when said drive shaft is at said one extreme position.

22. The method of rounding off digital counters to their nearest least significant digit in a computing register having a continuous quantity metering input, a quantity counter for accumulating quantity units incrementally, and a price counter for accumulating monetary units incrementally comprising, driving said price counter with said quantity counter when rounding off the quantity counter, and then rounding off the price counter.

23. The method of rounding off digital counters to their nearest least significant digit in a computing register having a continuous quantity metering input, a quantity counter for accumulating quantity units incrementally, and a price counter for accumulating monetary units incrementally comprising, driving one of said counters with the other counter when rounding off said other counter, and then rounding off said one counter.

* * * * *